United States Patent [19]
Steele

[11] Patent Number: 5,749,609
[45] Date of Patent: May 12, 1998

[54] FLEXIBLE CONNECTOR WITH FLOW PASSAGE INTEGRITY

[75] Inventor: James R. Steele, Stillwater, Minn.

[73] Assignee: Dynamic Air, Inc., St. Paul, Minn.

[21] Appl. No.: 743,491

[22] Filed: Nov. 4, 1996

[51] Int. Cl.⁶ ............................................. F16L 21/00
[52] U.S. Cl. .................... 285/226; 285/235; 285/363
[58] Field of Search ................................ 285/226, 235, 285/236, 364, 363

[56] References Cited

U.S. PATENT DOCUMENTS

| | | | |
|---|---|---|---|
| 1,977,175 | 10/1934 | Davis | 285/226 |
| 3,336,950 | 8/1967 | Fochler | 285/226 X |
| 3,606,400 | 9/1971 | Hines | 285/235 |
| 4,186,949 | 2/1980 | Bartha et al. | 285/226 |
| 5,163,717 | 11/1992 | Wise | 285/236 |

FOREIGN PATENT DOCUMENTS

| | | | |
|---|---|---|---|
| 582953 | 10/1958 | Italy | 285/235 |
| 4277394 | 10/1992 | Japan | 285/235 |
| 867346 | 5/1961 | United Kingdom | 285/236 |

*Primary Examiner*—Dave W. Arola
*Attorney, Agent, or Firm*—Jacobson & Johnson

[57] ABSTRACT

A flexible connector that maintains flow passage integrity with the flexible connector having a normally tubular section made of compressible material of substantially uniform thickness and having a flow passage therethrough, the tubular section of compressible material having a smoothly contoured interior surface for unimpeded flow of material thereover, and an exterior surface with a plurality of external circumferential ribs integral with the tubular section with the plurality of external circumferential ribs located in a spaced relationship to form circumferential valleys between adjacent ribs, with the circumferential valleys expandable or contractible zonally influenceable by the circumferential ribs proximate thereto, allowing the tubular section to be supported and formed into a smoothly curved section to thereby maintain the integrity of the flow passage through the tubular section of the flexible connector whether the flexible connector is in a straight or curved condition and an integral compressible flange which is radially supported by a rigid reinforcing band to prevent the flange from penetrating into the flow passage region of the flexible connector as the flange is axially squeezed to form a seal with a conveying apparatus.

14 Claims, 2 Drawing Sheets

FLEXIBLE CONNECTOR WITH FLOW PASSAGE INTEGRITY

FIELD OF THE INVENTION

This invention relates generally to conveying tubes and, more particularly, to flexible conveying tubes that can be flange attached and bent without destroying the flow passage integrity of the conveying tube.

BACKGROUND OF THE INVENTION

The art is replete with various types of flexible conveying tubes and pipes that can be bent to form a curved connection between two different apparatus. The difficulties with flexible conveying tubes is that oftentimes the flow passage integrity deteriorates when the conveying tube is bent or a flange is attached. By flow passage integrity, it is meant that if the flexible conveying tube has an internal substantially cylindrical passage with smooth walls while in the straight condition that when in the bent and mounted condition, the flexible conveying tube retains its internal substantially cylindrical passage with smooth walls even though the conveying tube walls are subject to external forces.

It has been found that the prior art conveying tubes suffer two drawbacks: the first is that when fastening the compressible flange of a conveying tube to a conveying apparatus, the flange material compresses radially inward to oftentimes deformably obstruct the flow passage through the conveying tube. The second drawback is that when the conveying tube is bent, the tube may kink or bend unevenly to produce a protrusion or recess along the interior of the conveying tube. The obstructions or recess produces a region where material being conveyed within the conveying tube can accumulate which can cause contamination problems. A further problem is that in order to have a flexible conveying tube that can support the working pressures within the system, it is usually necessary to have two different materials in the conveying tube, a first material for flexibility and a second fabric reinforcing material to provide radial strength for the conveying tube. The present invention provides a conveying tube with an integral flange that can be flange attached and bent to the desired condition while maintaining the flow passage integrity.

SUMMARY OF THE INVENTION

Briefly, the invention comprises a two-part flexible connector that maintains flow passage integrity with the flexible connector made of a compressible material. The first part of the flexible connector comprises a tubular section of substantially uniform thickness and having a flow passage therethrough. The tubular section of compressible materiel has a smoothly contoured interior surface for unimpeded flow of material thereover and an exterior surface covered with ribs and valleys. The second part of the flexible connector includes a plurality of external circumferential ribs integral with the tubular section, with the plurality of external circumferential ribs located in a spaced relationship to form circumferential valleys between adjacent ribs. The circumferential valleys are expandable or contractible with the regularity of the expansion and contraction of the valleys influenced by the circumferential ribs, which allows the tubular section to be bent and formed into a smoothly cursed section which maintains the integrity of the flow passage through the tubular section whether the conveying tube is in a straight or a curved condition. In addition, a compressible flange which is radially and concentrically restrained by a rigid band prevents the flange from penetrating into the flow passage region of the flexible connector and destroying the flow passage integrity as the flange is squeezed to form a seal between the flange and a conveying apparatus.

DESCRIPTION OF THE PREFERRED EMBODIMENT

Figure 1:
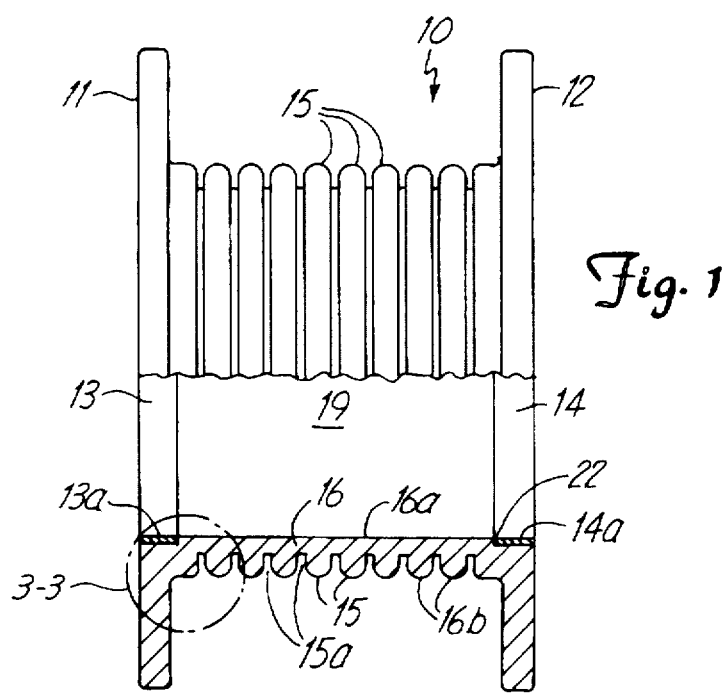
FIG. 1 is a partial cut-away view of the flexible connector of the invention.
Figure 4:
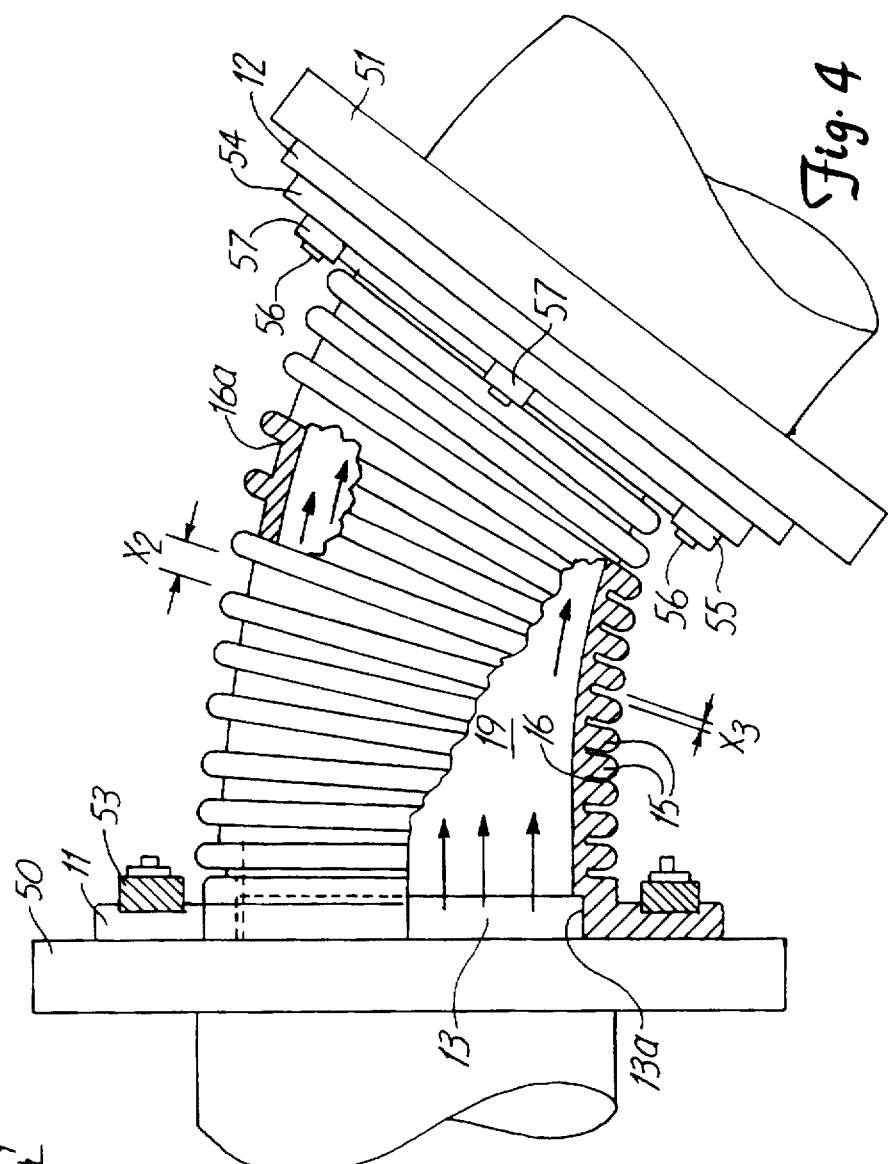
FIG. 4 is a partial cut-away view that shows a flexible connector in a bent condition.

FIG. 1 shows a flexible tube connector 10 for conveying materials therein, with the tube connector 10 having a flow passage 19 that retains its flow passage integrity whether the flexible tube connector is in a straight condition as shown in FIG. 1, or in a bent condition as shown in FIG. 4. Flexible tube connector 10 has a first end with a compressible flange 11 and a second end with a compressible flange 12. Tube connector 10 comprises two parts and has an interior surface 16a and an exterior surface 16b. The interior surface 16a has a smooth finish to permit flow of materials thereover without accumulation of the material thereon while the exterior surface 16b has an irregular surface formed by a plurality of integral spaced ribs 15 that extend circumferentially around flexible tube connector 10. The two parts are illustrated in FIG. 3a which shows the tubular section 16 and the external ribs 15. The ribs 15 are spaced from each other by a plurality of valleys 15a with ribs 15 and valleys 15a coacting so that when the tube connector is bent, the ribs maintain the flow integrity of the fluid passage 19 therein by distributing the bending forces to prevent kinking of the flexible tube connector 10. That is, with the plurality of external circumferential ribs located in a spaced relationship on the exterior part of the connector 10, it forms localized zonally influenceable regions on the inner part of the connector 10, which allows the inner surface 16a to be supported so that when the tube connector is bent, the inner surface 16a retains its smooth inner surface to thereby maintain the integrity of the flow passage through the flexible connector whether the flexible tube connector 10 is in a straight or a curved condition.

FIG. 1 shows that flange 11 is integrally connected to the first end of flexible tube connector 10 with both the flexible tube connector 10 and flange 11 made from a unitary, compressible but bendable material to permit flange 11 to be compression fastened in a sealing relationship with a first conveying apparatus.

Similarly, a flange 12, is integrally connected to the second end of flexible tube connector 10 with both the flexible tube connector 10 and flange 12 made from a unitary compressible but bendable material to permit flange 12 to be compression fastened in a scaling relationship with a second conveying apparatus.

Located within flange 11 is a rigid reinforcing band 13, with the rigid reinforcing band 13 concentrically and co-planerly positioned within flange 11, so that when flange 11 is compressed during the compression fastening of the flange 11, the rigid reinforcing band 13 prevents flange 11 from deformably penetrating into the flow passage 19 within the flexible tube connector 10. The reinforcing band 13 has an inner surface 13a that is in substantial alignment with the interior surface 16a of flexible tube connector 10 so that material can flow through passage 19 without accumulation on rigid reinforcing band 13 or interior surface 16a. Rigid reinforcing band 13 is of sufficient width so as to restrain radial inward movement of the flange, and is made of material sufficient to withstand the radial inward force on the flange 11. Metal or other suitable materials can be used as long as the materials have sufficient strength and do not react adversely with the materials being conveyed. If desired, the rigid reinforcing band 13 can be compressingly and frictionally held in flange by the inherent compressibility of the flange material.

Similarly, located within flange 12 is a rigid reinforcing band 14, with the rigid reinforcing band 14 concentrically and co-planerly positioned within flange 12 so that when flange 12 is compressed during the compression fastening, the rigid reinforcing band 14 prevents flange 12 from deformably penetrating into the flow passage 19 within the flexible tube connector 10. The reinforcing band 14 has an inner surface 14a that is in substantial alignment with the interior surface 16a of flexible tube connector 10 so that material can flow through passage 19 without accumulation on rigid reinforcing band 14 or interior surface 16a. Similarly, rigid reinforcing band 14 is of sufficient width so as to restrain radial inward movement of the flange 12 and is made of material sufficient to withstand the radial inward force on the flange 12. Metal or other suitable materials can be used as long as the materials have sufficient strength and do not react adversely with the materials being conveyed. If desired, the rigid reinforcing band 14 can be compressingly and frictionally held in flange 12 by the inherent compressibility of the flange material.

Figure 3:
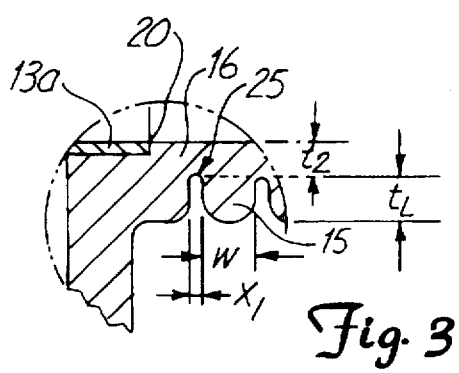
FIG. 3 is an enlarged area taken from 3—3 of FIG. 1.
Figure 3A:
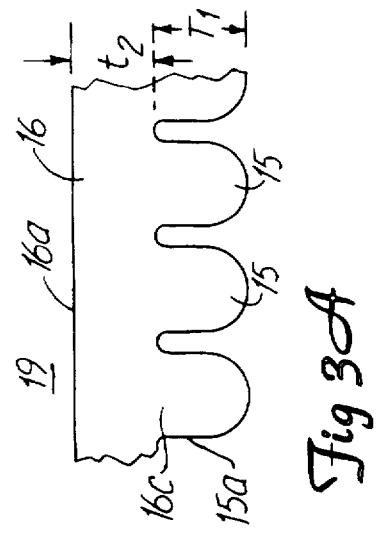
FIG. 3A is an enlarge view of the straight section and external ribs for maintaining the integrity of the flexible connector.

FIG. 1 and FIG. 3 illustrate the nature of the smooth junction between rigid reinforcing band 13 and surface 16a and rigid reinforcing band 14 and surface 16a. In the embodiment shown, the flexible tube connector 10 and the flanges 11 and 12 are made of the same material. A suitable material for use in an abrasion resistance environment is an abrasion resistant polyurethane polymer such as polyurethane compound # NRC-1901 having a durometer of 80-90 on the shore "A" scale.

Figure 2:
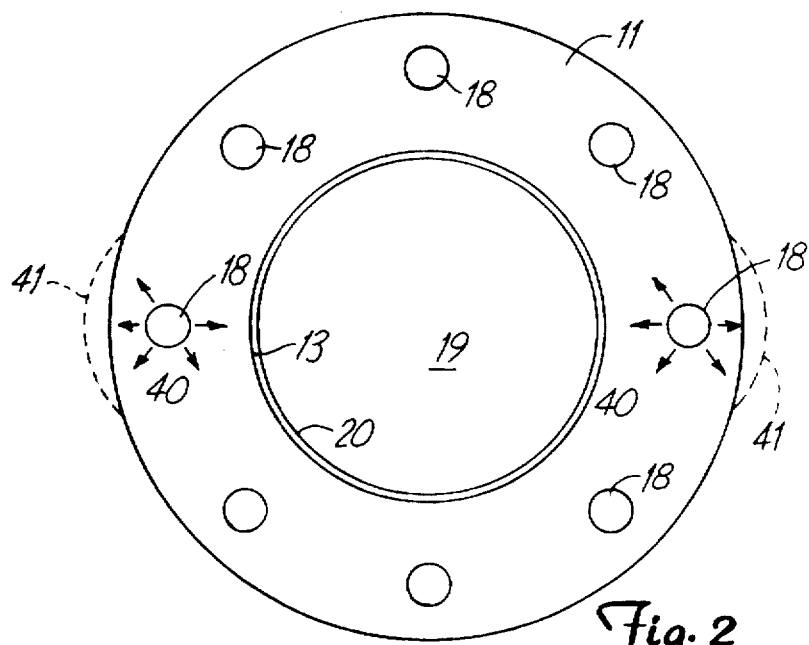
FIG. 2 is an end view of the flexible connector of FIG. 1.

FIG. 2 shows an end view of the flexible tube connector 10 with both the tube connector 10 and the flange 11 having a circular cross section. A set of holes 18 are spaced circumferentially around flange 11. In forming the sealing compression, flange 11 is compressed which forces the material around hole 18 laterally outward from the holes. To illustrate the action of the forces, two of holes 19 are included with arrows 40 pointing radially outward to indicate the natural movement of the flange material 11 as the flange is squeezed. The dotted lines 41 indicate how the flange bulges outward. However, the inward bulging of flange 11, which would push flange material into passage 19 is prevented by rigid reinforcing band 13 which is located substantially concentric and coplanar with flange 11 in. That is, rigid reinforcing band 13 prevents flange 13 from deforming inward into the flow passage 19 shown in FIG. 1

FIG. 3 and 3A provide further detail of the flexible tube connector 10 wherein the flexible tube 10 is shown to comprises a first part or straight tubular section of compressible material of substantially uniform thickness $t_2$ as defined by surface 16 and by the dotted line 16c. The FIGS. 3 and 3A show a straight section of compressible material 16 has a smoothly contoured interior surface 16a for unimpeded flow of material thereover. The outside portion which comprises the second part has an exterior surface 16b with a plurality of external circumferential ribs 15 that are integral with straight section 16 with the plurality of external circumferential ribs 15 located in a spaced relationship to one another to form circumferential valleys 15a between adjacent ribs. FIG. 3 shows that ribs 15 have a spacing indicated by $x_1$ when the tube connector 10 is in the straight condition as shown in FIG. 1. The circumferential valleys 15a are expandable or contractible to allow the straight section 16 of flexible tube connector 10 to be formed into a smoothly curved section to maintain the integrity of the flow passage 19 through the flexible tube connector.

FIG. 4 shows flexible tube connector 10 mounted in a bent condition with flange 11 attached to a first conveying apparatus 50 by a ring 53, which is shown in section. Similarly, flange 12 is attached to a second conveying apparatus 12 by a compression ring 54 which is secured by bolts 56 and nuts 57.

FIG. 4 shows flexible tube connector 10 partially in section to reveal the external ribs 15 in compression and extension. The lower portion of ribs 15 have a valley distance indicated by $x_3$, which is less than $x_1$ shown in FIG. 3, and the top portion of ribs 15 have a valley distance indicate by $x_2$ which is greater than distance $x_1$ shown in FIG. 3. A noted feature is that even though the tube connector has been bent, the surfaces 16a remain smooth and continuous so as to maintain the flow passage integrity of the flexible connector.

In the embodiment shown, the flexible tube connector 10 and flanges 11 and 12 are free of fabric backing which is normally used with flexible connectors. That is, with the present configuration, one can provide the strength to withstand the high pressures often encountered in conveying apparatus as well as maintaining the integrity of the flow passage 19 without having to use a fabric backing. That is, the flow passage 19 has a smooth interior surface 16a completely around the internal periphery of tube connector 10 even though the tube 16 is bent to attach it to spaced apart conveying apparatus.

FIG. 4 illustrates that when in the bent condition rigid reinforcing band 13 has an inner surface 13a located in alignment with interior surface 16a so that materials can pass unimpeded over inner surface 13a of rigid reinforcing band 13a and the interior surface 16a.

With the present invention the external circumferential ribs 15 having a smoothly radiused exterior are normally spaced sufficiently close to each other so that when the straight section 16 is bent, the circumferential ribs 15 form a zone of influence which is generally identified by reference numeral 59 in FIG. 3A. The radial compression resistant force provide by ribs 15 prevents the surface 16a from flexing inward into the passage 19. That is, the support to straight section 16 by ribs 15 allows the straight section 16 to compress or expand in the valleys 15a without having the straight section surface 16a penetrate into the flow passage 19.

FIG. 3 shows an enlarged view of a portion of the flexible tube connector 10 wherein the straight tubular section 16 has a first part of thickness $t_2$ is located between the external circumferential ribs 15 which are of width "w" and a second part of thickness $t_1$ is compressible or expandable with the ribs 15 and sufficiently yieldable so as to allow the interior to deform radial inward but sufficiently massive so as to prevent the straight section integral with each rib from deflecting radially inward into flow passage 19 to interrupt the flow passage integrity.

I claim:

1. A flexible tube connector for conveying materials therein with the tube connector having a flow passage that retain its flow passage integrity whether the flexible tube connector is in a straight or bent condition comprising:

a tube having a first end and a second end, said tube having an interior surface and an exterior surface; said interior surface having a smooth finish to permit flow of materials thereover without accumulation of the material thereon, said exterior surface having a plurality of integral spaced ribs extending around said tube, said ribs spaced from each other by a plurality of valleys with said ribs and said valleys coacting so that when said tube is bent the ribs maintain the flow integrity of the fluid passage therein by distributing a bending force to prevent kinking of said tube;

a flange, said flange integrally connected to said first end of said tube with said tube and said flange made from a compressible but bendable material to permit said flange to be compression fastened in a sealing relationship with a conveying apparatus; and a rigid reinforcing band, said rigid reinforcing band concentrically positioned within said flange so that when said flange is compressed during the compression fastening said rigid reinforcing band prevents said flange from deformably penetrating into the flow passage within the tube, said reinforcing band having an inner surface that is in substantial alignment with the interior surface of said tube so that material can flow through said tube without accumulation on said rigid reinforcing band or said interior surface.

2. The flexible tube connector of claim 1 wherein said tube and said flange are made of the same material.

3. The flexible tube connector of claim 2 including a further flange with said further flange connected to said second end of said tube.

4. The flexible tube connector of claim 3 wherein said rigid reinforcing band is metal.

5. The flexible tube connector of claim 4 wherein said tube and said flange have a circular cross section.

6. The flexible tube connector of claim 5 wherein said tube and said flange are free of fabric backing.

7. The flexible tube connector of claim 6 wherein said tube comprises an abrasion resistant polyurethane polymer.

8. A flexible tube connector wherein said flexible tube connector comprises a first part comprising a tubular section of substantially uniform thickness having a flow passage therethrough, said tubular section having a smoothly contoured interior surface for unimpeded flow of material thereover, said tubular section of compressible material having an exterior surface with a plurality of external circumferential ribs integrally attached to said tubular section with said ribs sufficiently massive so as to influence the deforming of said flexible tube connector, said plurality of external circumferential ribs located in a spaced relationship to form multiple circumferential valleys between adjacent ribs with said circumferential valleys expandable or contractible to allow the tubular section of compressible tube to be formed into a smoothly curved section which is supported by the external ribs to maintain the integrity of the flow passage through said tubular section of flexible tube connector whether the flexible tube connector is in a straight or a curved condition, said flexible tube connector including a compressible flange integral with said tubular section and said circumferential ribs and a rigid reinforcing ring said rigid reinforcing ring located substantially concentric and co-planer with said flange to prevent said flange from deforming inward into the flow passage within said tubular section.

9. The flexible tube connector of claim 8 wherein said rigid reinforcing band has an inner surface with said inner surface located in alignment with said interior surface so that materials can pass unimpeded over said inner surface of said rigid reinforcing band and said interior surface.

10. The flexible tube connector of claim 8 wherein the external circumferential ribs are spaced sufficiently close to each other so that when said tubular section is bent said circumferential ribs form a zone of influence for said tubular section that allows said tubular section to compress or expand without having said tubular section penetrate into the flow passage within said tubular section.

11. The flexible tube connector of claim 10 wherein said circumferential ribs have a radiused exterior.

12. The flexible tube connector of claim 10 wherein said external circumferential rib, said flange and said tubular section comprises a molded polyurethane.

13. The flexible tube connector of claim 12 wherein said molded polyurethane has a minimum hardness of 80 durometer on the shore A scale.

14. The flexible tube connector of claim 8 wherein said tubular section integral with said external circumferential ribs is compressible or expandable with said tubular section and said external ribs are sufficiently massive so as to restrain and distribute radial inward so as to prevent the tubular section integral therewith from deflecting radially inward and disrupting the flow passage integrity when the tubular section is bent.

* * * * *